United States Patent [19]

Gray et al.

[11] Patent Number: 5,110,845

[45] Date of Patent: May 5, 1992

[54] EXTRUDABLE CURABLE ORGANOSILOXANE COMPOSITIONS

[75] Inventors: Thomas E. Gray; Jary D. Jensen, both of Midland, Mich.

[73] Assignee: Dow Corning Corporation, Midland, Mich.

[21] Appl. No.: 622,700

[22] Filed: Dec. 3, 1990

[51] Int. Cl.$^5$ .................................................. C08K 9/10
[52] U.S. Cl. .................................... 523/211; 523/213; 524/862
[58] Field of Search .................... 523/211, 213; 524/62

[56] References Cited

U.S. PATENT DOCUMENTS

| | | | |
|---|---|---|---|
| 3,671,480 | 6/1972 | Wada et al. | 260/29.1 SB |
| 3,884,866 | 5/1975 | Jeram | 260/32.8 SB |
| 4,013,611 | 3/1977 | Hechtl et al. | 524/862 |
| 4,057,596 | 11/1977 | Takamizawa et al. | 260/825 |
| 4,162,243 | 7/1979 | Lee et al. | 260/37 SB |
| 4,427,801 | 1/1984 | Sweet | 524/868 |
| 4,481,341 | 11/1984 | Schlak et al. | 523/211 |
| 4,500,659 | 2/1985 | Kroupa et al. | 523/213 |
| 4,539,357 | 9/1985 | Bobear | 524/267 |
| 4,753,978 | 6/1988 | Jensen | 524/862 |
| 4,766,176 | 8/1988 | Lee et al. | 528/32 |
| 4,946,878 | 8/1990 | Jensen et al. | 524/862 |

FOREIGN PATENT DOCUMENTS 1269007  3/1972  United Kingdom.

*Primary Examiner*—Melvyn I. Marquis
*Assistant Examiner*—Karen A. Hellender
*Attorney, Agent, or Firm*—Robert Spector

[57] ABSTRACT

The tear strength of cured organosiloxane elastomers can be increased and the compression set value reduced without adversely affecting other physical properties if the composition used to prepare the elastomer is curable by a platinum-catalyzed hydrosilation reaction and contains a mixture of two liquid diorganoalkenylsiloxy terminated polydiorganosiloxanes, one of which constitutes from 96 to 99.5 percent by weight of said mixture and contains the alkenyl radicals only at the terminal positions. The second polydiorganosiloxane contains both terminal alkenyl radicals and from 1 to 5 mole percent of alkenyl radicals on non-terminal repeating units.

11 Claims, No Drawings

EXTRUDABLE CURABLE ORGANOSILOXANE COMPOSITIONS

BACKGROUND OF THE INVENTION

1. Field of the Invention

This invention relates to extrudable organosiloxane compositions. More particularly, this invention relates to extrudable organosiloxane compositions that can be cured by a platinum-catalyzed hydrosilation reaction to form elastomers exhibiting superior physical properties, particularly tear strength and compression set value, without sacrificing other desirable properties such as tensile strength and processability of the curable composition.

2. Description of the Prior Art

Curable organosiloxane compositions containing at least one polydiorganosiloxane with at least two silicon-bonded vinyl radicals, an organohydrogensiloxane or organic peroxide curing agent and a silica filler are well known in the art pertaining to silicone elastomers. It is also known to improve the physical properties, particularly tensile and tear strengths, of cured elastomers prepared from these curable compositions by using two or more vinyl-containing polydiorganosiloxanes of different molecular weights or a single vinyl-containing polydiorganosiloxane having a bimodal molecular weight distribution.

British patent no. 1,269,007 that issued to Wada and Ito on Mar. 29, 1972 teaches peroxide curable compositions containing two polydiorganosiloxanes (1 and 2) each of which contains at least 3000 diorganosiloxane units per molecule and a third polydiorganosiloxane containing from 10 to 1000 siloxane units per molecule. Three different vinyl-containing polydiorganosiloxanes are used to achieve high tear strength in the cured elastomer. Polymer 1 contains either no vinyl radicals or from 0.02 to 0.3 mole percent of vinyl radicals at either terminal or non-terminal positions in the molecule, polymer 2 contains from 5 to 20 mole percent of vinyl-containing siloxane units and polymer 3 contains from 5 to 90 percent of vinyl-containing siloxane units. The tensile strength of the cured elastomers are about 9.8 MPa and the maximum tear strength value reported is 45 kilonewtons per meter (kN/m). The curable compositions would have the consistency of a gum.

U.S. Pat. No. 3,671,480, which issued on Jun. 20, 1972 to the same inventors named on the aforementioned British patent, teaches organosiloxane compositions that cure by a platinum-catalyzed hydrosilation reaction to yield elastomers exhibiting high values of tear strength. These compositions contain two different vinyl-substituted polydiorganosiloxanes. The first of these polymers contains from 0.02 to 0.2 mole percent of vinyl-substituted siloxane units and an average of at least 3000 siloxane units per molecule, which is equivalent to a gum-type polydimethylsiloxane having a viscosity of at least 1000 Pa.s. The vinyl radicals of this polymer can be located on either terminal or non-terminal repeating units. In all of the exemplified compositions the aforementioned first polymer contains non-terminal vinyl radicals. The second polymer contains an average of at least 100 siloxane units per molecule and at least 2 mole percent of non-terminal vinyl-substituted siloxane units. In the exemplified compositions the first polydiorganosiloxane contains an average of from 6,000 to 10,000 repeating units and from 0.1 to 0.15 mole percent of methylvinylsiloxane units per molecule, and the second polydiorganosiloxane contains from 200 to 8000 repeating units per molecule and from 1 to 50 mole percent of methylvinylsiloxane units. The maximum tear strength value reported for a cured elastomer is 59.4 kN/m. and the tensile strength of this sample is 10094 kPa.

U.S. Pat. No. 4,057,596, which issued to Takamizawa et al. on Nov. 8, 1977 discloses anti-sticking coating compositions containing two vinyl-substituted polydiorganosiloxanes, one of which contains vinyl only at the terminal positions and exhibits a viscosity of from 30 to 5,000 centistokes. The second polydiorganosiloxane contains at least 3 vinyl radicals per molecule that can be at terminal or non-terminal positions and exhibits a viscosity of from 10 centistokes to the consistency of a gum. There is nothing in this patent suggesting addition of filler to obtain compositions useful for preparing elastomeric materials other than films.

U.S. Pat. No. 4,539,357, which issued to Bobear on Sep. 3, 1985 discloses peroxide cured organosiloxane compositions containing two different gum-type vinyl-substituted polymers exhibiting viscosities of from 1000 to 200,000 Pa.s. One of these polymers contains from 0.005 to 0.1 mole percent of vinyl-substituted siloxane units and the second contains from 0.5 to 15 mole percent of these units, with the proviso that the relative concentration of the second polymer decreases as its vinyl content increases. The vinyl-containing siloxane units of both polymers can be located at terminal or non-terminal positions within the molecule. Cured elastomers prepared using these compositions exhibit tear strengths in excess of 22 kN/m. The highest tear strength value reported in the examples is 66 kN/m. The tensile strength of this sample is 7341 kPa.

The composition described in the aforementioned Bobear patent have the consistency of a gum, are not readily processable in conventional injection molding equipment and cannot be transported by pumping using conventional equipment.

U.S. Pat. No. 3,884,866, which issued to Jeram and Striker on May 20, 1975 discloses curable organosiloxane compositions containing (A) 100 parts of a high viscosity component containing at least one vinyl-terminated polydiorganosiloxane having a viscosity of from 5,000 to 1,000,000 centipoise (5 to 1,000 Pa.s) at 25 degrees C., and (B) from 5 to 40 parts of a low viscosity component containing at least one polydiorganosiloxane having a viscosity of from 50 to 5,000 centipoise (0.05 to 5 Pa.s) at 25 degrees C. The curable compositions also contain an organohydrogensiloxane and a platinum hydrosilation catalyst. The structural formulae for ingredients (A) and (B) indicate that the non-terminal repeating units of both the high and low viscosity polymers can contain vinyl radicals, however none of the exemplified compositions contain vinyl radicals bonded to non-terminal repeating units.

The highest tear strength value reported for the cured elastomers prepared using these exemplified compositions is 250 pounds per inch (43.8 kN/m) and the highest tensile strength value is 1100 psi (7590 kPa.). The increase in tear strength and tensile strength is achieved at the cost of the hardness of the cured elastomer, as measured on the Shore A durometer scale. The reported durometer value for this sample is 45.

U.S. Pat. No. 4,162,243, which issued to Lee et al. on Jul. 24, 1979 discloses organosiloxane compositions that cure by the same mechanism disclosed in the aforementioned Jeram and Striker patent. Because of differences in the molecular weight distribution of the vinyl-containing polydiorganosiloxane described by Lee et al. and the vinyl-containing polydiorganosiloxanes of Jeram and Striker, cured elastomers prepared using the compositions of Lee et al. exhibit higher durometer hardness values using less silica filler, with a resultant decrease in the viscosity of the curable composition. This is achieved by the presence in the curable composition of Lee et al. of (1) a silica filler with vinyl-containing organosiloxane groups bonded to its surface and (2) a triorganosiloxy-terminated polydimethylsiloxane composition wherein the triorganosiloxy terminal groups are defined as dimethylvinylsiloxy or phenylmethylvinylsiloxy and the composition exhibits a specified molecular weight distribution and dispersity index. The required molecular weight distribution can be achieved using a single polydimethylsiloxane or a mixture of two or more polydimethylsiloxanes.

The triorganosiloxy terminated polydimethylsiloxanes present in the compositions of the aforementioned Lee et al. patent by definition exclude the presence of ethylenically unsaturated hydrocarbon radicals in any non-terminal repeating unit.

The elastomers prepared by curing the compositions exemplified in the Lee et al. patent exhibit considerably lower tear strength values (35 kN/m) than the maximum value of 43.8 kN/m reported by Jeram et al. and the 66 kN/m reported in the aforementioned Bobear patent, however the maximum durometer hardness values of 62 and 65 measured on the Shore A scale, are considerably higher than the values reported by Jeram et al.

Extrudable organosiloxane compositions curable to elastomers exhibiting desirably high values of tear and tensile strengths are described in U.S. Pat. No. 4,753,978, which issued to J. Jensen on Jun. 28, 1988. The inventive feature of the compositions described in this patent is the combination of a first polydiorganosiloxane (A) exhibiting a viscosity of from 20 to 200 Pa.s and containing ethylenically unsaturated hydrocarbon radicals only at the terminal positions with from 5 to 30 weight percent, based on the first polydiorganosiloxane, of a second polydiorganosiloxane (B) wherein from 1 to 5 percent of the non-terminal silicon atoms contain an ethylenically unsaturated hydrocarbon radical.

Depending upon the concentration of ethylenically unsaturated hydrocarbon radicals present in polydiorganosiloxane (B), the tensile strength of cured elastomers prepared using the compositions claimed in the aforementioned Jensen patent range from 7,266 to 10,191 kPa and the tear strength from 38.5 to 52.6 kN/m.

When one attempts to replace polydiorganosiloxane (A) of the Jensen patent that contains vinyl only at the terminal positions with a polymer exhibiting a viscosity less than 20 Pa.s the tear strength of the resultant cured elastomer is substantially below the values reported in this patent.

The present inventors have now discovered how to increase the tear strength of silicone elastomers prepared by curing silica-filled compositions comprising a diorganoalkenylsiloxy terminated polydiorganosiloxane similar to polydiorganosiloxane (A) of the aforementioned Jensen patent, but exhibiting a viscosity below the range claimed in this patent, an organohydrogensiloxane as the curing agent and a platinum group metal-containing hydrosilation catalyst. They have accomplished this by decreasing the relative concentration of polydiorganosiloxane B to a level below Jensen's lower limit of 5 percent, based on the total weight of polydiorganosiloxanes containing ethylenically unsaturated hydrocarbon radicals. From 1 to 5 mole percent of the silicon atoms of polyorganosiloxane B contain ethylenically unsaturated hydrocarbon radicals.

SUMMARY OF THE INVENTION

An objective of this invention is to define a class of liquid curable organosiloxane compositions that yield elastomers exhibiting a combination of high tear strength with compression set values less than 25%. A preferred class of the present compositions can be transported by pumping using conventional equipment.

The present compositions are cured using a platinum-catalyzed hydrosilation reaction.

DETAILED DESCRIPTION OF THE INVENTION

This invention provides a curable organosiloxane composition comprising the product obtained by mixing to homogeneity
(A) from 96 to 99.5 weight percent, based on the total weight of (A) and (B), of a first liquid diorganoalkenylsiloxy terminated polydiorganosiloxane exhibiting a viscosity of up to 20 Pa.s and containing essentially no alkenyl radicals bonded to non-terminal silicon atoms,
(B) from 0.5 to 4 weight percent, based on the total weight of (A) and (B), of a second diorganoalkenylsiloxy terminated liquid polydiorganosiloxane that is miscible with said first polydiorganosiloxane, exhibits a viscosity of from 0.1 to 20 Pa.s and contains alkenyl radicals on from 1 to 5 mole percent of the non-terminal repeating units,
(C) an amount sufficient to cure said composition of an organohydrogensiloxane that is miscible with ingredients (A) and (B), and contains an average of more than two silicon bonded hydrogen atoms per molecule,
(D) a hydrosilation catalyst comprising a platinum-group metal or a compound thereof, the concentration of said catalyst being sufficient to promote curing of said composition at a temperature of from ambient to 250 degrees C., and
E. from 10 to 60 weight percent, based on the weight of said composition, of a reinforcing silica filler.

The reinforcing silica filler is treated with at least one organosilicon compound that preferably includes an disilazane containing alkenyl radicals, such as sym-tetramethyldivinyldisilazane.

The present inventors discovered that the preferred silica treating agent further reduces the compression set values of the cured elastomer.

The ingredients of the present compositions will now be discussed in detail.

1. The Alkenyl-Substituted Polydiorganosiloxanes (Ingredients A and B)

The inventive feature considered responsible for the unique combination of physical properties, particularly the high tear strength and low compression set, exhibited by elastomers prepared from the present curable composition is the presence in the composition of two specific types of miscible diorganoalkenylsiloxy-terminated polydiorganosiloxanes in a specified range of relative concentrations.

The first of the two polydiorganosiloxanes, referred to hereinafter as ingredient A, exhibits a viscosity of from 5 to 20 Pa.s, contains vinyl or other ethylenically unsaturated radicals only at the terminal positions of the molecule and constitutes from 96 to 99.5 percent of combined weight of the two polydiorganosiloxanes A and B.

The second of the two diorganoalkenylsiloxy-terminated polydiorganosilxanes, referred to hereinafter as ingredient B, contains alkenyl radicals on from 1 to 5 mole percent of the non-terminal repeating siloxane units.

Cured elastomers prepared using preferred compositions of this invention exhibit tear strength values of 35-45 kilonewtons/meter.

Experimental data for these preferred elastomers demonstrates that the tear strength reaches a maximum as the concentration of ingredient B approaches about 3 weight percent, based on the combined weight of ingredients A and B and decreases with increasing concentration of ingredient B beyond the 3 percent level.

The alkenyl radicals present in ingredients A and B contain from 2 to about 10 carbon atoms. Preferred alkenyl radicals are terminally unsaturated, and include but are not limited to vinyl, allyl and 5-hexenyl.

The silicon-bonded organic groups present in ingredients A and B, in addition to alkenyl radicals, are the monovalent hydrocarbon or substituted hydrocarbon radicals described in detail in the following portions of this specification.

The term "essential absence of non-terminal ethylenically unsaturated radicals" used to describe ingredient A means that the only ethylenically unsaturated hydrocarbon radicals present on the non-terminal silicon atoms of this ingredient result from impurities present in the reactants used to prepare this ingredient or from undesired rearrangements occurring during preparation of this ingredient.

Ingredient A is a diorganoalkenylsiloxy-terminated polydiorganosiloxane, and can be represented by the average general formula

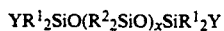

YR$^1_2$SiO(R$^2_2$SiO)$_x$SiR$^1_2$Y where Y represents an alkenyl radical containing from 2 to 10 carbon atoms, R$^1$ and R$^2$ are individually monovalent hydrocarbon radicals or substituted monovalent hydrocarbon radicals containing from 1 to 20 carbon atoms, R$^1$ and R$^2$ are substantially free of ethylenic unsaturation, and x represents a degree of polymerization equivalent to a viscosity of up to 20 Pa.s at 25 degrees C. In preferred embodiments the viscosity of ingredient A is from 5 to 15 Pa.s The R$^1$ and R$^2$ radicals can be identical or different. Because ingredient A is an extrudable liquid at 25 degrees C., at least one of the R$^2$ radicals on each of the non-terminal silicon atoms is lower alkyl, most preferably methyl. The remaining R$^2$ radical can be alkyl such as methyl or ethyl; substituted alkyl such as chloromethyl, 3-chloropropyl or 3,3,3-trifluoropropyl; cycloalkyl such as cyclohexyl; or aryl such as phenyl. Any R$^1$ and R$^2$ radicals other than methyl are preferably phenyl or 3,3,3-trifluoropropyl, this preference being based on the availability of the intermediates used to prepare these polydiorganosiloxanes and the properties of cured elastomers prepared by curing compositions containing these polymers.

The alkenyl radical represented by Y have been defined in a preceding section of this specification.

Methods for preparing the liquid polydiorganosiloxanes used as ingredients A and B of the present compositions by hydrolysis and condensation of the corresponding halosilanes or cyclic polydiorganosiloxanes are sufficiently disclosed in the patent and other literature that a detailed description in this specification is not necessary.

Ingredient B is a liquid diorganoalkenylsiloxy-terminated polydiorganosiloxane that can be represented by the average general formula

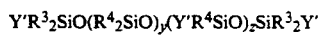

Y'R$^3_2$SiO(R$^4_2$SiO)$_y$(Y'R$^4$SiO)$_z$SiR$^3_2$Y'

In this formula Y' represents an alkenyl radical as defined for the Y radical of ingredient A, R$^3$ and R$^4$ are selected from the same group of monovalent hydrocarbon radicals and substituted monovalent substituted hydrocarbon radicals as R$^1$ and R$^2$. Because ingredients A and B should be miscible with one another, the silicon bonded hydrocarbon radicals present in these ingredients should be selected from the same class, i.e. lower alkyl. These hydrocarbon radicals, including A and A' are preferably identical.

The degree of polymerization represented by the sum of y and z is equivalent to a viscosity of from 0.1 to about 10 Pa.s, preferably from 0.1 to 1 Pa.s, and the ratio z/(y+z) is from 0.01 to 0.05, which specifies the requirement for this ingredient that from 1 to 5 mole percent of the non-terminal repeating units contain a vinyl radical. The degree of polymerization of Ingredient B is preferably less than the degree of polymerization of Ingredient A.

Preferred embodiments of ingredient A include but are not limited to dimethylvinylsiloxy-terminated polydimethylsiloxanes, dimethylvinylsiloxy-terminated polymethyl-3,3,3-trifluoropropylsiloxanes, dimethylvinylsiloxy-terminated-dimethylsiloxane/3,3,3-trifluoropropylmethylsiloxane copolymers and dimethylvinylsiloxy-terminated-dimethylsiloxane/methylphenylsiloxane copolymers.

Preferred embodiments of ingredient B encompass all of the preferred polydiorganosiloxanes for ingredient A with the addition of from 1 to 5 mole percent of non-terminal organoalkenylsiloxane units, where the preferred organic group are alkyl containing from 1 to 4 carbon atoms, fluoroalkyl such as 3,3,3-trifluoropropyl, and aryl such as phenyl.

The vinyl radicals present in preferred embodiments of ingredients A and B can be replaced by other alkenyl radicals such as allyl and hexenyl.

2. The Organohydrogensiloxane Curing Agent
(Ingredient C)

The organosiloxane compositions of this invention are cured by a platinum-catalyzed hydrosilation reaction. The curing agent is an organohydrogensiloxane containing an average of more than two silicon bonded hydrogen atoms per molecule. The organohydrogensiloxane contains from as few as four silicon atoms per molecule up to an average of 20 or more, and can have a viscosity of up to 10 Pa.s or higher at 25 C. The repeating units of this ingredient include but are not limited to HSiO$_{1.5}$, R$^5$HSiO and/or R$^5_2$HSiO$_{0.5}$ in addition to one or more of monoorganosiloxy, diorganosiloxane, triorganosiloxy and SiO$_{4/2}$ units. In these formulae R$^5$ represents a monovalent hydrocarbon or halocarbon radical as defined hereinabove for the $R^2$ radical of ingredient A.

One preferred class of organohydrogensiloxanes are copolymers consisting essentially of the repeating units $R^5_3SiO_{\frac{1}{2}}$, $R^5_2SiO$, $R^5HSiO$, and $R^5SiO_{3/2}$ units, where the $RSiO_{3/2}$ units constitute from 0.5 to 50 mole percent of the copolymer. Copolymers of this type can prepared by a controlled hydrolysis of a mixture comprising the corresponding organosilicon halides, such as the chlorides, or the corresponding alkoxides. These and other methods for preparing the preferred organohydrogensiloxanes of this invention are sufficiently well known that a detailed description is not required in this specification.

A second preferred class of organohydrogensiloxanes contain repeating units represented by the formulae $R^5_2HSiO_{\frac{1}{2}}$ and $SiO_{4/2}$. The concentration of $R^5_2HSiO_{\frac{1}{2}}$ units is equivalent to a concentration of silicon-bonded hydrogen atoms in the copolymer of from 0.5 to about 5 weight percent.

Proper curing of the present compositions requires that ingredients A, B and C be miscible with one another. To ensure sufficient miscibility the silicon bonded hydrocarbon radicals that are present in the highest concentration in these ingredients should be selected from the same class, e.g. alkyl radicals. These hydrocarbon radicals are preferably identical. In particularly preferred compositions these hydrocarbon radicals are methyl or combinations of methyl with either 3,3,3-trifluoropropyl or phenyl.

The molar ratio of silicon bonded hydrogen atoms to vinyl or other ethylenically unsaturated hydrocarbon radicals in compositions curable by a hydrosilation reaction is critical with respect to the properties of the cured elastomer. The optimum ratio for the present curable compositions will be determined at least in part by the molecular weights of ingredients A and B, the type of curing agent and the concentration of any resinous organosiloxane copolymer described hereinafter. For preferred compositions of this invention this ratio is preferably from 0.8 to about 3.

The optimum range of this ratio for other curable compositions of this invention can readily be determined by those skilled in the art with a minimum of experimentation.

For particularly preferred compositions of this invention the molar ratio of silicon bonded hydrogen atoms to vinyl or other ethylenically unsaturated hydrocarbon radicals is between 1 and 2.

3. The Platinum Hydrosilation Catalyst and Optional Inhibitor

Hydrosilation reactions are typically conducted in the presence of a catalyst that is a metal from the platinum group of the periodic table or a compound of such a metal. Platinum, rhodium and compounds of these metals have been shown to effectively catalyze hydrosilation reactions.

Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968.

Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70 degrees C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agents and platinum-containing catalysts may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

4. The Silica Filler

To achieve the high levels of tear strength and other physical properties that characterize cured elastomers prepared using the compositions of this invention, the compositions must contain a reinforcing silica filler. This type of filler is typically treated with one or more of the known silica treating agents to prevent a phenomenon referred to as "creping" or "crepe hardening" during processing of the curable composition.

Any finely divided form of silica can be used as the reinforcing filler. Colloidal silicas are preferred because of their relatively high surface area, which is typically at least 50 square meters per gram. Fillers having surface areas of at least 300 square meters per gram are preferred for use in the present method. Colloidal silicas can be prepared by precipitation or a fume process. Both of these preferred types of silica are commercially available.

The amount of finely divided silica used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

Silica treating agent are typically low molecular weight organosilicon compounds containing silicon-bonded hydroxyl groups or groups that can be hydrolyzed to hydroxyl groups in the presence of water. Typical hydrolyzable groups include halogen atoms such as chlorine amino and other groups containing a silicon-bonded nitrogen atom.

Preferably at least a portion of the silicon bonded hydrocarbon radicals present on the treating agent are alkenyl radicals and the remainder are identical to a majority of the hydrocarbon radicals present in ingredients A and B.

The present inventors discovered that when a sym-tetraalkyldivinyldisilazane constitutes a portion of the silica treating agent used to treat the reinforcing silica portion of the present curable compositions, cured elastomers prepared from these compositions exhibit lower values of compression set relative to elastomers prepared from curable compositions employing other conventional silica treating agents such as low molecular weight hydroxyl-terminated polydiorganosiloxanes. In preferred compositions the alkyl groups on the silazane are methyl.

Compression set is typically determined using ASTM test method D395. In accordance with this procedure a sample of cured elastomer of known thickness, typically 1.25 cm., is compressed to 75 percent of its initial thickness in a suitable clamping device and then heated at a temperature of 177° C. for twenty two hours. The sample is then allowed to stand for 0.5 hour under ambient conditions, at which time its thickness is measured. Compression set is calculated using the formula $(A-C)/(A-B)\times 100$, where A is the initial thickness of the sample, B is the thickness to which the sample is compressed during the test and C is the thickness of the final sample following compression and relaxation.

Low values of compression set are required for certain end-use applications during which the cured elastomer is compressed between two mating surfaces to serve as a seal or gasket.

5. Optional Ingredients

In addition to the vinyl-containing polydiorganosiloxanes, curing agent, catalyst and silica filler the organosiloxane compositions of this invention can contain one or more additives that are conventionally present in curable compositions of this type. These materials are added to impart or enhance certain properties of the cured elastomer or facilitate processing of the curable composition. A small amount of water can be added together with the silica treating agent(s) as a processing aid.

Typical additives include but are not limited to pigments, dyes, adhesion promoters, flame retardants, heat and/or ultraviolet light stabilizers and resinous organosiloxane copolymers to enhance the physical properties of the cured elastomer.

Diatomaceous earth and calcium hydroxide are two preferred additives based on their ability to reduce the degradation in physical properties, particularly tensile strength and modulus, and the increase in compression set value that occur when the cured elastomer comes into contact with oil heated to 150° C. or higher. The presence of calcium hydroxide also further reduces the compression set value of the cured elastomer.

6. Preparation of Curable Compositions

The silica filler can be treated in the presence of at least a portion of the other ingredients of the present compositions by blending these ingredients together until the filler is completely treated and uniformly dispersed throughout the composition to form a homogeneous material. The ingredients that are present during treatment of the silica typically include the silica treating agents and at least a portion of the polydiorganosiloxanes referred to herein as ingredients A and B. The organohydrogensiloxane and platinum-containing catalyst are typically added after treatment of the silica has been completed. If calcium hydroxide is one of the ingredients, it is also added at this time.

Irrespective of the type of mixer used, blending of the silica, filler treating agent(s) and ingredients A and B is continued while the composition is heated at temperatures from about 100 to 250 degrees C. under reduced pressure to remove volatile materials. The resultant product is then cooled prior to being blended with the organohydrogensiloxane (Ingredient C) and/or the platinum catalyst (Ingredient D), depending upon whether it is desired to prepare a one-part or two-part curable composition of this invention. The optional additives referred to hereinbefore can be added at this time or during blending of the silica with ingredients A and B.

In-situ treatment of the silica can require anywhere from 15 minutes to 2 hours, depending upon the amount of material being processed, the viscosity of the material and the shear rate to which the material is subjected during processing.

Alternatively, treatment of the silica can occur before the silica is blended with other ingredients of the present compositions. Methods for treating finely divided silica fillers prior to incorporating the silica into a polyorganosiloxane composition are known in the art.

To ensure adequate blending of all ingredients the mixing equipment in which the present compositions are prepared should be capable of subjecting the composition to a high rate of shear. The advantage of using this type of a "high intensity" mixer to prepare silica filled polyorganosiloxane compositions is taught in U.S. Pat. No. 3,690,804, which issued to Minuto on Jun. 1, 1976. In accordance with the disclosure of this patent, the tip of the stirring device in the mixer is rotated at a speed of from 25 to about 250 feet per second, which would generate considerable shearing forces. The exemplified compositions are blended in a Henschel high intensity mixer wherein the rotor was operated at a speed of 3800 revolutions per minute, equivalent to a rotor tip speed of 157 feet per second.

Dough type mixers equipped with "sigma" shape blades, are not as efficient as mixers wherein the mixing surfaces are of a relatively flat "paddle" configuration. Examples of the paddle type mixers include the Henschel mixer disclosed in the aforementioned Minuto patent and certain mixers manufactured by Neulinger A.G. The blade is preferably rotated at a speed of at least 100 revolutions per minute.

Curable compositions prepared using the present method typically exhibit viscosities of about 0.5 up to about 10,000 Pa.s at 25 degrees C. Preferred compositions are extrudable. To facilitate blending and transfer of the compositions and minimize entrapment of air during mixing a viscosity of less than about 10 Pa.s at 25 degrees C. is preferred, particularly for extrudable compositions.

Because mixtures of ingredients A and/or B with the curing agent (ingredient C) and the platinum-containing catalyst may begin to cure under the conditions encountered during storage of these composition even in the presence of a catalyst inhibitor, to ensure long term storage stability it is desirable to separate the curing agent and the catalyst until it is desired to cure the composition. This can be achieved by packaging the curing agent and curing catalyst in separate containers or by encapsulating the curing catalyst in a thermoplastic organic or silicone resin that melts or softens at the temperature to which the composition is intended to be heated during the curing process.

One part compositions curable by a platinum-catalyzed hydrosilation reaction and containing as the hydrosilation catalyst a liquid platinum compound that is microencapsulated within a thermoplastic organic polymer together with methods for preparing the microencapsulated catalyst are described in U.S. Pat. No. 4,766,176, which issued to Lee et al. on Aug. 23, 1988. The pertinent sections of this patent are incorporated into this specification by reference thereto.

7. Fabrication and Curing of Shaped Articles

The present curable compositions can be formed into shaped articles by press molding, injection molding, extrusion, or any of the other methods used to fabricate organosiloxane compositions.

In the absence of one of the aforementioned catalyst inhibitors or an encapsulated catalyst, the compositions will cure at ambient temperature over a period of several hours or days, or within in several minutes when heated at temperatures of up to 250 degrees C. Compositions containing one of these catalyst inhibitors are typically cured by heating them for several minutes at temperatures of from 50 to about 250 degrees C. A preferred range is from 100 to 200 degrees C. It should be apparent that compositions containing a microencapsulated catalyst must be heated to at least the melting or softening point of the encapsulating polymer to liberate the catalyst.

Cured elastomeric articles prepared using the curable compositions of this invention exhibit tear strengths above about 230 pounds per inch (38 kN/m) and low values of compression, that are typically below 25% without adversely affecting other desirable properties of the cured elastomer or the extrudability of the composition from which it is formed. This unique combination of properties make the elastomers desirable for a number of end use applications, including gaskets and fabricated articles wherein at least a portion of the article is relatively thin and subjected to large amounts of stress. Articles of this type include diaphragms and bladders.

The following examples describes preferred curable compositions of this invention and the desirable properties of elastomers, particularly low values of compression set and high tear strength, prepared by curing these compositions. The example is intended to illustrate the present invention and should not be interpreted as limiting the invention as defined in the accompanying claims. Unless indicated to the contrary all parts and percentages are by weight and all viscosities were measured at 25 degrees C.

EXAMPLE 1

This example demonstrates the improvement in tear strength and compression set of cured elastomers achieved by including from 1 to 3 percent, based on the total weight of vinyl-containing polydiorganosiloxanes, of a polydiorganosiloxane containing vinyl radicals on non-terminal silicon atoms when the viscosity of the polydiorganosiloxane containing vinyl radicals only on the terminal silicon atoms is less than the 20 Pa.s lower limit required by the compositions claimed in the aforementioned patent to Jensen.

Curable organosiloxane compositions were prepared by blending to homogeneity in a dough type mixer the entire quantity (325 parts) of a fume silica having a nominal surface area of 380 $m^2$ per gram, 62.5 parts of diatomaceous earth, 1.9 parts of sym-tetramethyldivinyldisilazane, 65 parts of hexamethyldisilazane, 9.4 parts water and 422.5 parts of a dimethylvinylsiloxy terminated polydimethylsiloxane having a viscosity of about 10 Pa.s at 25 degrees C. (ingredient A). This mixture was heated for one hour by circulating steam through the jacket of the mixer while volatile materials were removed under reduced pressure.

Following completion of the heating cycle the resultant master batch (composition I) was blended to homogeneity with the quantities of ingredients A and B specified in the following Table 1 together with 7.2 parts of a silanol terminated polydimethylsiloxane having a viscosity of about 0.04 Pa.s at 25° C. and containing about 4 weight percent of silicon-bonded hydroxyl groups. Ingredient B was a dimethylvinylsiloxy-terminated dimethylsiloxane/methylvinysiloxane copolymer exhibiting a viscosity of 0.3 Pa.s and containing 2 mole percent of methylvinylsiloxane units.

Two-part curable compositions of this invention and compositions evaluated for comparative purposes were prepared by dividing each of the resultant mixtures (composition II) into 250 gram samples.

A 250 gram sample of each composition evaluated was blended to homogeneity with one of two different organohydrogensiloxanes and ingredient E, a reaction product of hexachloroplatinic acid and sym-tetramethyldivinyldisilazane that had been diluted with a liquid dimethylvinylsiloxy terminated polydimethylsiloxane in an amount sufficient to achieve a platinum content of 0.7 weight percent, based on the weight of both parts of the curable composition. The amount of ingredient E, the catalyst for the curing reaction of the composition, was equivalent to from 5 to 10 parts per million parts by weight of platinum, based on the weight of the complete curable composition.

One of the two organohydrogensiloxanes, (C1) contained 0.8 weight percent silicon bonded hydrogen, exhibited a viscosity of 0.016 Pa.s and corresponded to the general formula $(Me_3SiO_{\frac{1}{2}})_{12.7} (Me_2SiO)_{29.1} (MeHSiO)_{54.6} (MeSiO_{3/2})_{3.6}$. The second (C2), a contained 1 weight percent of silicon bonded hydrogen atoms, exhibited a viscosity of 0.024 Pa.s and was represented by the general formula $(SiO_{4/2})_{4.4} Me_2HSiO_{\frac{1}{2}})_8$. 0.5 grams of methylbutynol as a platinum catalyst inhibitor (ingredient F) was also added to each of the compositions. The amount of ingredient C1 or C2 added was equivalent to a molar ratio of silicon bonded hydrogen atoms to vinyl radicals in the total curable composition of 1.25.

The compositions were cured in the form of sheets having a thickness of 1.9 mm. by confining the compositions in a chase that was then placed in hydraulic press.

The compositions were heated for 5 minutes at a temperature of 150 degrees C. Test samples were then cut from each of the sheets to determine the physical properties of the cured materials.

The American Society of Testing Procedures (ASTM) method used to measure the various properties evaluated included ASTM-412 for tensile strength and elongation, ASTM-D625, Die B for tear strength, ASTM-D2240, Shore A scale for durometer hardness values, and ASTM D395 for compression set values.

Table 1 summarizes the parts by weight of ingredients A and B added to composition I; and the amounts of ingredient C1 and C2 added to composition II. The physical properties of the cured compositions are summarized in Table 2.

TABLE 1

| Sample No. | Ingredient | | | |
|---|---|---|---|---|
| | A (parts*) | B (parts*) | C1 (grams) | C2 (grams) |
| 1 | 196.3 | 6.3 (1%)** | 1.98 | 0 |
| 2 | 183.6 | 18.8 (3%) | 2.15 | 0 |
| 3*** | 171.3 | 31.3 (5%) | 2.32 | 0 |
| 4*** | 158.8 | 43.8 (7%) | 2.48 | 0 |
| 5*** | 202.6 | 0 | 1.90 | 0 |
| 6 | 196.3 | 6.3 (1%) | 0 | 1.59 |
| 7 | 183.8 | 18.8 (3%) | 0 | 1.72 |
| 8*** | 171.3 | 31.3 (5%) | 0 | 1.85 |
| 9*** | 158.8 | 43.8 (7%) | 0 | 1.99 |
| 10*** | 202.6 | 0 | 0 | 1.51 |

*Parts added to masterbatch (composition I)
**Percentages of B are based on combined weight of A and B
***Included for comparative purposes

TABLE 2

| Sample No. | Tear Strength kN/m | Hardness (Shore A) | Compression Set % | Tensile Strength MPa |
|---|---|---|---|---|
| 1 | 40.4 | 53 | 26.8 | 6.2 |
| 2 | 46.3 | 56 | 22.2 | 5.4 |
| 3* | 42.3 | 61 | 28.5 | 5.4 |
| 4* | 17.5 | 66 | 34.1 | 7.3 |
| 5* | 34.1 | 52 | 32.8 | 8.1 |
| 6 | 14.7 | 52 | 22.7 | 5.9 |
| 7 | 36.5 | 57 | 23.1 | 5.4 |
| 8* | 17.5 | 60 | 25.7 | 5.1 |
| 9* | 20.3 | 64 | 29.4 | 7.0 |
| 10* | 21.2 | 53 | 29.2 | 8.3 |

*Included for purposes of comparison

The data in Table 2 demonstrate that by using the curable compositions of this invention one is able to substantially improve the tear strength and/or reduce the compression set of cured elastomers relative to prior art materials prepared using extrudable organosiloxane compositions without adversely affecting other desirable properties such as tensile strength, hardness and elongation. While the tear strength exhibited by comparative sample 3 was higher than the value for sample 1, sample 1 exhibited the lower compression set value.

EXAMPLE 2

This example demonstrates the lower compression set values achieved using a preferred silica treating agent of this invention.

Curable organosiloxane compositions were prepared using the types and amounts of ingredients and the procedure described in the preceding Example 1. In this instance the comparative examples replaced the 0.31 parts of sym-tetramethyldivinyldisilazane (T1) used as the silica treating agent with 0.92 parts of a hydroxyl terminated dimethylsiloxane/methylvinylsiloxane copolymer containing about 10 weight percent vinyl radicals and about 16 weight percent hydroxyl radicals (T2). The concentration of vinyl radicals contributed to the composition by each of these silica treating agents was equal.

The amounts of ingredients A and B added to the masterbatch and the amounts of organohydrogensiloxanes C1 or C2 added to prepare the curable compositions are summarized in Table 3 and the compression set values of the cured elastomers are summarized in Table 4.

TABLE 3

| Sample No. | Ingredient | | | |
|---|---|---|---|---|
| | A Parts* | B Parts* | C1 Grams | C2 Grams |
| 11a | 196.3 | 6.3 | 1.98 | 0 |
| 11b | 196.3 | 6.3 | 0 | 1.59 |
| 12a | 183.8 | 18.8 | 2.15 | 0 |
| 12b | 183.8 | 18.8 | 0 | 1.72 |
| 13a | 171.3 | 31.3 | 2.31 | 0 |
| 13b | 171.3 | 31.3 | 0 | 1.82 |

*Parts added to master batch (Composition I)

TABLE 4

| Sample | Treating Agent | Compression Set Value (%) |
|---|---|---|
| 11a | T1 | 26.8 |
| 11a* | T2 | 62.0 |
| 11b | T1 | 22.7 |
| 11b* | T2 | 63.2 |
| 12a | T1 | 22.2 |
| 12a* | T2 | 69.1 |
| 12b | T1 | 23.1 |
| 12b* | T2 | 72.4 |
| 13a | T1 | 28.5 |
| 13a* | T2 | 49.9 |
| 13b | T1 | 25.7 |
| 13b* | T2 | 63.2 |

*Comparative Samples

In every instance the sample prepared using the polyorganosiloxane as the filler treating agent exhibited a higher compression set value than the sample containing the disilazane-treated filler.

That which is claimed is:

1. In a curable organosiloxane composition comprising the product obtained by mixing to homogeneity
    A. from 96 to 99.5 weight percent, based on the total weight of (A) and (B), of a first diorganoalkenylsiloxy terminated polydiorganosiloxane exhibiting a viscosity of from 5 to 20 Pa.s at 25 degrees C. and containing essentially no alkenyl radicals bonded to non-terminal silicon atoms;
    B. a second diorganoalkenylsiloxy terminated polydiorganosiloxane that is miscible with said first polydiorganosiloxane and exhibits a viscosity of from 0.1 to 20 Pa.s at 25 degrees C., where from 1 to 5 percent of the non-terminal repeating units of said second diorganoalkenylsiloxy-terminated polydiorganosiloxane contain an alkenyl radical;
    C. an amount sufficient to cure said composition of an organohydrogensiloxane that is miscible with (A) and (B), and contains an average of more than two silicon bonded hydrogen atoms per molecule,
    D. a hydrosilation catalyst comprising a metal from the platinum group of the periodic table or a compound of said metal, the amount of said catalyst being sufficient to promote curing of said composition at a temperature of from ambient to 250 degrees C., and E. from 10 to 60 weight percent, based on the weight of said composition, of a reinforcing silica filler that is treated with at least one organosilicon compound, where the organic radicals bonded to the silicon atoms of (A), (B) and (C) are monovalent hydrocarbon or halogenated hydrocarbon radicals, the improvement comprising the presence in said composition of from 0.5 to 4 weight percent, based on the combined weights of (A) and (B), of said second diorganoalkenylsiloxy terminated polydiorganosiloxane, whereby the tear strength of cured elastomers prepared from said composition is from 35–45 kilonewtons per meter and the compression set values of said elastomers is less than 35%.

2. A composition according to claim 1 where said first diorganoalkenylsiloxy terminated polydiorganosiloxane (A) is represented by the average general formula $$YR^1{}_2SiO(R^2{}_2SiO)_xSiR^1{}_2Y$$

where Y represents an alkenyl radical containing from 2 to 10 carbon atoms, $R^1$ and $R^2$ are individually monovalent hydrocarbon radicals or substituted monovalent hydrocarbon radicals containing from 1 to 20 carbon atoms, $R^1$ and $R^2$ are substantially free of ethylenic unsaturation, and x represents a degree of polymerization equivalent to a viscosity of 5 to 15 Pa.s at 25 degrees C. and said second diorganoalkenylsiloxy terminated polydiorganosiloxane (B) is represented by the average general formula $$Y'R^3{}_2SiO(R^4{}_2SiO)_y(R^4ViSiO)_zSiR^3{}_2Y'$$

where Y' is selected from the same group as Y, $R^3$ and $R^4$ are selected from the same group of monovalent hydrocarbon radicals and substituted monovalent substituted hydrocarbon radicals as $R^1$ and $R^2$, the degree of polymerization represented by the sum of y and z is equivalent to a viscosity of from 0.1 to 10 Pa.s, the ratio $z/(y+z)$ is from 0.01 to 0.05, the concentration of said catalyst (D) is equivalent to at least 1 ppm of platinum metal, based on the weight of said composition and said filler (E) is treated with at least two organosilicon compounds where a portion of said compounds is a sym-tetraalkyldivinyldisilazane.

3. A composition according to claim 2 where the alkenyl radicals present in (A) and (B) are terminally unsaturated and are selected from vinyl, allyl and 5-hexenyl radicals, and the concentration of said catalyst is equivalent to from 5 to 50 ppm of platinum metal, based on the weight of said composition.

4. A composition according to claim 3 where at least 50 percent of the radicals represented by $R^1$, $R^2$, $R^3$ and $R^4$ are methyl and any remaining radicals are selected from the group consisting of phenyl and 3,3,3-trifluoropropyl; said organohydrogensiloxane is a copolymer consisting essentially of the repeating units $R^5{}_3SiO_{\frac{1}{2}}$, $R^5{}_2SiO$, $R^5HSiO$, and $R^5SiO_{3/2}$ units, where the $RSiO_{3/2}$ units constitute from 0.5 to 50 mole percent of the copolymer or is represented by the formula $R^5{}_2HSiO_{\frac{1}{2}}$ and $SiO_{4/2}$. The concentration of $R^5{}_2HSiO_{\frac{1}{2}}$ units is equivalent to a concentration of silicon-bonded hydrogen atoms in the copolymer of from 0.5 to about 5 weight percent.

5. A composition according to claim 4 where $R^1$, $R^2$, $R^3$ and $R^4$ are methyl, the sum of y and z is equivalent to a viscosity of from 0.1 to 1 Pa.s at 25 degrees C. and the hydrocarbon radicals present in said organohydrogensiloxane (C) are methyl and the molar ratio of silicon bonded hydrogen atoms in ingredient (C) to alkenyl radicals in said composition is from 0.8 to 3.

6. A composition according to claim 5 where said molar ratio of silicon bonded hydrogen atoms to alkenyl radicals is from 1 to 2.

7. A composition according to claim 6 where a portion of the organosilicon compounds used to treat said filler is sym-tetramethyldivinyldisilazane and said hydrosilation catalyst (D) is a complex of a liquid platinum compound with a low molecular weight organosiloxane wherein the silicon bonded hydrocarbon radicals are vinyl and either methyl or 3,3,3-trifluoropropyl.

8. A composition according to claim 1 where said composition is packaged in at least two parts, with the organohydrogensiloxane (C) and said hydrosilation catalyst (D) located in separate parts of said composition.

9. A composition according to claim 7 where said platinum compound is microencapsulated in a thermoplastic organic or organosilicone polymer.

10. A composition according to claim 1 where said composition is extrudable.

11. A method for simultaneously increasing the tear strength and reducing the compression set of elastomers prepared from curable organosiloxane compositions comprising (A) from 96 to 99.5 weight percent, based on the total weight of (A) and (B), of a first diorganoalkenylsiloxy terminated polydiorganosiloxane exhibiting a viscosity of up to 20 Pa.s at 25° C. and containing essentially no alkenyl radicals bonded to non-terminal silicon atoms;

(C) an amount sufficient to cure said composition of an organohydrogensiloxane that is miscible with (A) and (B), and contains an average of more than two silicon bonded hydrogen atoms per molecule;

(D) a hydrosilation catalyst comprising a metal from the platinum group of the periodic table or a compound of said metal, the amount of said catalyst being sufficient to promote curing of said composition at a temperature of from ambient to 250° C.; and (E) from 10 to 60 weight percent, based on the weight of said composition, of a reinforcing silica filler that is treated with at least one organolsilicon compound, said method comprising adding to said composition (B) from 0.5 to 4 weight percent, based on the combined weights of (A) and (B), of a second diorganoalkenylsiloxy terminated polydiorganosiloxane that is miscible with said first polydiorganosiloxane and exhibits a viscosity of from 0.1 to 20 Pa.s at 25° C., where from 1 to 5 percent of the non-terminal repeating units of said second diorganoalkenylsiloxy-terminated polydiorganosiloxane contain an alkenyl radical.

* * * * *